D. W. JONES.
AUTOMOBILE SPRING AND CONNECTION THEREFOR.
APPLICATION FILED FEB. 13, 1917.
1,292,611.
Patented Jan. 28, 1919.
2 SHEETS—SHEET 1.
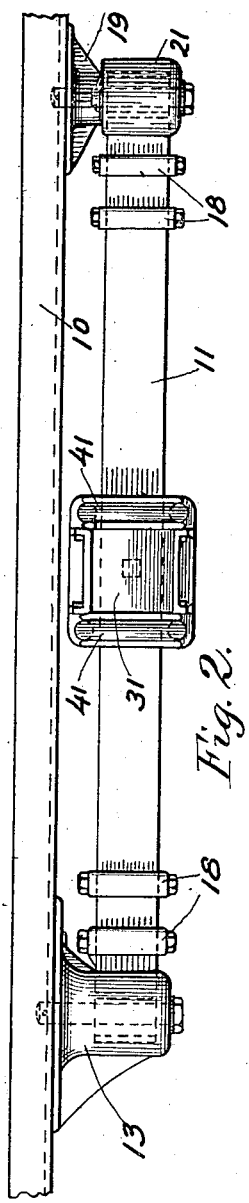
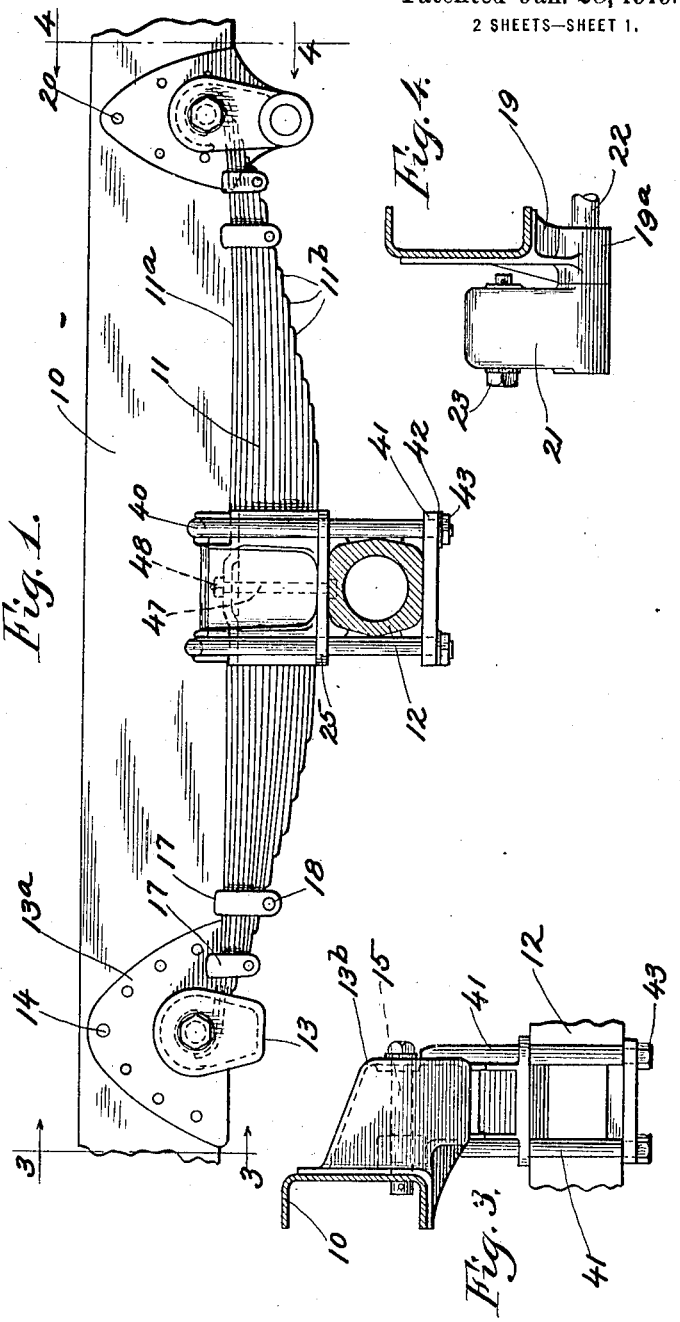
Witness:
C. E. Burnap
Inventor:
David W. Jones
By Sheridan, Scott & Sheridan, Attys.

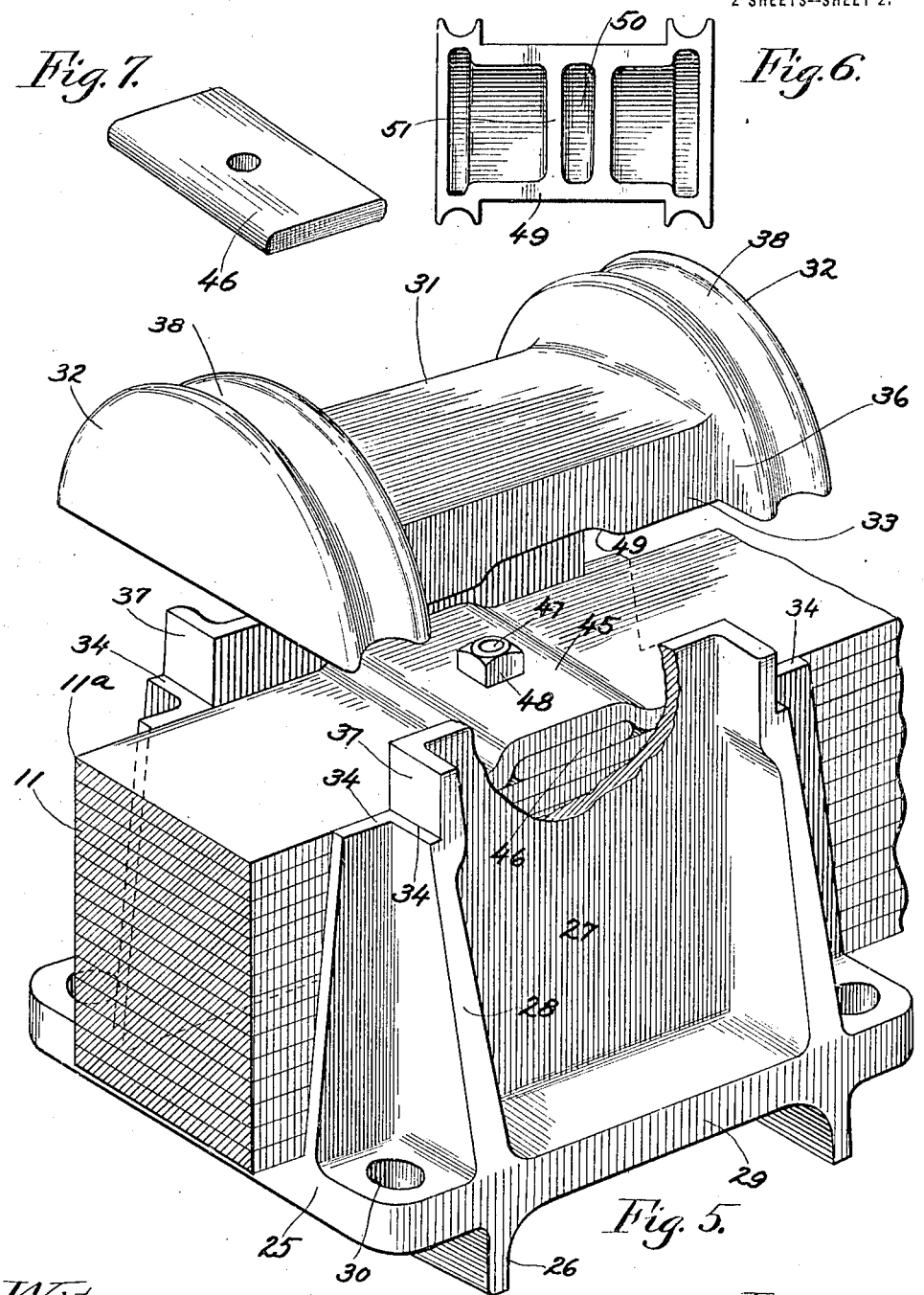

UNITED STATES PATENT OFFICE.

DAVID W. JONES, OF CHICAGO, ILLINOIS.

AUTOMOBILE-SPRING AND CONNECTION THEREFOR.

1,292,611.          Specification of Letters Patent.        Patented Jan. 28, 1919.

Application filed February 13, 1917. Serial No. 148,298.

*To all whom it may concern:*

Be it known that I, DAVID W. JONES, a citizen of the United States, residing at Chicago, in the county of Cook and State of Illinois, have invented certain new and useful Improvements in Automobile-Springs and Connections Therefor, of which the following is a specification.

This invention relates to springs and to means for mounting and connecting the same, and the purpose of the present invention is to provide an improved spring and connection particularly adapted for use in automobiles or the like where the power is transmitted from the driving axle to the frame through the springs.

In some automobiles it is the practice to transmit the power to the frame of the driving axle by means of radius rods, but in others the power is transmitted through the springs, and the particular object of the present invention is to provide an improved spring construction and improved means for connecting the same to the driving axle so that the driving force of the axle can be transmitted through the spring to the frame without dislocating any parts of the spring, or any parts of the connections of the spring on the axle. A further object is to provide a connection of the spring on the axle whereby the driving force is transmitted through the spring without causing the displacement of the leaves thereof and without causing a shearing stress on bolts or other fastenings which may be employed to unite the leaves. A further object is to provide means whereby the driving force will be transmitted through one or more leaves of the spring without affecting the other leaves. Another feature is the provision of connecting means for attaching the spring to the axle, having interlocking parts whereby relative displacement thereof under the influence of the driving force transmitted from the axle is prevented.

The various features and objects of this invention will appear more clearly from the following specification taken in connection with the accompanying drawings in which one embodiment of the invention is illustrated. In the drawings—

Figure 1 is a side elevation of a portion of the side-frame of an automobile showing my improved spring and the means for attaching the same to the axle;

Fig. 2 is a top plan view of the construction shown in Fig. 1.

Fig. 3 is a sectional view taken on the line 3—3; of Fig. 1;

Fig. 4 is a sectional view taken on the line 4—4 of Fig. 1 with certain parts removed;

Fig. 5 is an enlarged perspective view showing the bracket and cap member for securing the spring with a portion of the spring illustrated in normal position;

Fig. 6 shows a bottom plan view of the cap member; and

Fig. 7 shows a perspective view of the member which is inserted beneath the top leaf of the spring.

Although my invention is capable of being applied to various types of springs, I have shown it as being embodied in a spring of the semi-elliptic type, and in the accompanying drawings have shown the spring as being connected to the rear axle of an automobile and to the side-frame thereof. In the drawings the side-frame of the usual channel form is designated by the numeral 10 and is connected, by means presently to be described, with the spring 11 consisting of a plurality of leaves including an upper leaf $11^a$ and a plurality of lower leaves $11^b$ of varying length, according to the usual method of construction. This spring is connected at its central part to the rear axle 12 of the automobile, from which the driving force is transmitted to the frame of the automobile.

The forward end of the spring 11 is secured to the side-frame 10 by means of a bracket 13, which comprises a flange $13^a$ secured to the side-frame by means of rivets 14 and an outwardly projecting hooded bracket $13^b$ having extending transversely therethrough the bolt 15, around which the upper leaf $11^a$ extends according to the usual method of spring construction. The various leaves of the spring are preferably held together adjacent each end of the spring by means of U-shaped clips 17 and bolts 18. At the rear end of the spring 11, a bracket 19 is attached to the side-frame 10 by means of rivets 20, and this bracket has a hub portion $19^a$ which is pivotally connected to the hanger 21 by means of a bolt 22. The upper end of the pivoted hanger 21 has a bolt 23 extending transversely therethrough, and this bolt is pivotally connected with the upper leaf 11ª of the spring in the usual manner.

The axle 12 has mounted thereon a bracket 25 which has downwardly extending flanges 26, whose inner surfaces are adapted to conform to the contour of the sides of the axle, as shown, for instance, in Fig. 1. The walls 27 of this bracket extend vertically in parallel planes and are adapted to receive between them the various leaves of the spring 11, the walls being arranged to form a close fit with the spring so that lateral movement of the leaves thereof is prevented. The walls 27 are reinforced by means of the laterally extending ribs 28. The base plate 29 of the bracket is provided with vertical apertures 30 through the corner portions thereof adjacent the ends of the walls 27 for a purpose to be hereinafter described. A cap member 31, having arcuate or partially circular end flanges 32, is adapted to seat upon the top leaf of the spring between the side walls 27 of the bracket, and the sides 33 of this cap are adapted to coact with the inner surfaces of the side walls 27. The walls 27 at the ends of the bracket terminate flush with or slightly below the upper surface of the top leaf 11ª forming shoulders 34 which are extended around the ribs 28 by cutting away a portion thereof, as shown particularly in Fig. 5. The projecting inner surfaces 36 of the end flanges 32 of the cap are adapted to coact with the surfaces 37 of the ribs 28 above the shoulders 34 so that longitudinal or lateral displacement of the cap with respect to the bracket is effectively prevented. The end flanges 32 are provided with arcuate grooves 38 on their upper sides which are adapted to receive U-bolts 40 which extend downwardly at each end of the bracket through the holes 30 and thence downwardly through suitable apertures in a plate 41 which coacts with the underside of the axle 12. These U-bolts are secured by washers 42 and nuts 43 so that the cap 31 and the spring 11 are held in fixed position by these U-bolts with respect to the bracket 25.

The upper leaf 11ª of the spring is provided with an upward hump or offset 45 directly above the axle 12, and the space beneath this hump is occupied by a plate 46 which is inserted therein as shown particularly in Fig. 5. A bolt 47 having its head seated in a suitable socket in the axle extends upwardly through the plate 46 as well as through all of the leaves of the spring and also through the base plate 29, being engaged at its upper end by a nut 48. This bolt serves to secure the leaves of the spring against vertical displacement, but is not intended to take up the driving strain transmitted through the spring, since this force is transmitted from the upper leaf 11ª of the spring to the cap 31 and the bracket 25 through the hump 45, which is adapted to fit into a recess 49 of corresponding contour formed in the underside of the cap member 31. The cap member 31 also has a recess 50 formed by the transverse flanges 51, which recess receives the nut 48 while the flanges 51 prevent turning thereof.

It will be seen that when the members are assembled as shown in Figs. 1 and 2, the bracket 25 and cap member 31 will be held in fixed position with respect to the axle 12 by the U-bolts 40 and the plate 41. The surfaces 33 of the cap member coacting with the walls 27 of the bracket and the surfaces 36 of the cap coacting with the surfaces 37 of the bracket will effectively prevent any lateral or longitudinal displacement of the cap with respect to the bracket, and the driving force transmitted from the axle to the bracket will be transmitted from the bracket to the cap member through the coacting surfaces just mentioned, and thence the driving force will be transmitted to the offset portion 45 of the upper leaf which is connected to the side-frame in the manner previously described. In this way the driving force is transmitted through the spring by parts of sufficient strength which are firmly connected to the axle without any possibility of causing a relative displacement of the various leaves of the spring, or without any possibility of shearing the connecting bolts or other means which unite the leaves.

Although I have shown and described a particular embodiment of this invention for purposes of illustration, it will be understood that it may be constructed in other forms without departing from the scope of this invention as defined in the appended claims.

What I claim is:

1. In a device of the class described, a vehicle frame, an axle, a plate mounted on said axle, a spring comprising a plurality of leaves seated on said plate, means for connecting a leaf of said spring to said frame, and a cap member rigidly connected to said leaf of said spring and interlocked with said plate.

2. In a device of the class described, a vehicle frame, an axle, a spring comprising a plurality of leaves, means for connecting one leaf of said spring to said frame, a plate mounted on said axle and having an integral part extending upwardly at the side of said spring, said leaf of said spring having an offset portion forming a shoulder, a cap mounted on said spring and engaging said shoulder, and means for effecting an interlocking connection of said cap to said integral part of said plate.

3. In a device of the class described, a vehicle frame, an axle, a spring comprising a plurality of leaves, means for connecting one leaf of said spring to said frame, a plate mounted on said axle and having integral side walls extending upwardly in contact with the opposite sides of said spring, a cap mounted on said spring and interlocking with the side walls of said plate in such manner that relative movement of said cap transversely or longitudinally of said spring with respect to said plate is prevented, and means for securing said cap against vertical movement with respect to said plate.

4. In a device of the class described, a vehicle frame, an axle, a spring comprising a plurality of leaves, means for connecting one leaf of said spring to said frame, a plate mounted on said axle and having integral side walls extending upwardly in contact with the opposite sides of said spring, a cap mounted on said spring and interlocking with the side walls of said plate in such manner that relative movement of said cap transversely or longitudinally of said spring with respect to said plate is prevented, means for securing said cap against vertical movement with respect to said plate, and separate means for uniting the leaves of said spring.

5. In a device of the class described, a vehicle frame, an axle, a spring comprising a plurality of leaves, means for connecting said spring to said frame, a bracket connected to said axle and having integral parts engaging the sides of said spring, a cap member seated on said spring and coacting with said bracket, means for uniting said axle with said bracket and cap member, and coacting shoulders on said spring and said cap member through which driving forces are transmitted from said axle to said frame.

6. In a device of the class described, a vehicle frame, an axle, a spring comprising a plurality of leaves, means for connecting said spring to said frame, a bracket connected to said axle and engaging the sides of said spring, a cap member seated on said spring and coacting with said bracket, and means for uniting said axle with said bracket and cap member, the upper leaf of said spring having an offset portion, and said cap member having a recess to receive the offset portion of said spring.

7. In a device of the class described, a vehicle frame, an axle, a spring comprising a plurality of leaves, means for connecting said spring to said frame, a bracket on which said spring is seated, said bracket having walls coacting with the lateral sides of said spring, a cap member seated on said spring, said cap member and said bracket having coacting surfaces preventing relative longitudinal or transverse displacement thereof, and means for uniting said cap member with said bracket, the upper leaf of said spring being provided with a hump, and said cap member having a recess arranged to conform to the contour of said hump.

8. In a device of the class described, a vehicle frame, an axle, a spring comprising a plurality of leaves, means for connecting said spring to said frame, a bracket on which said spring is seated, said bracket having walls coacting with the lateral sides of said spring, a cap member seated on said spring, said cap member and said bracket having coacting surfaces preventing relative longitudinal or transverse displacement thereof, means for uniting said cap member with said bracket, the upper leaf of said spring being provided with a hump, said cap member having a recess arranged to conform to the contour of said hump, and a plate inserted beneath the hump in said upper leaf.

9. In a device of the class described, a vehicle frame, an axle, a spring comprising a plurality of leaves, means for connecting said spring to said frame, a bracket on which said spring is seated, said bracket having walls coacting with the lateral sides of said spring, a cap member seated on said spring, said cap member and said bracket having coacting surfaces preventing relative longitudinal or transverse displacement thereof, means for uniting said cap member with said bracket, the upper leaf of said spring being provided with a hump, said cap member having a recess arranged to conform to the contour of said hump, a plate inserted beneath the hump in said upper leaf, and a bolt extending through said plate and the leaves of said spring, said cap member having a recess to receive said bolt.

10. In a device of the class described, a vehicle frame, an axle, a spring connected to said frame, a plate mounted on said axle and having walls extending upwardly at the sides of said spring, a cap mounted on said spring over said plate, said plate and said cap having coacting shoulders to prevent relative lateral movement thereof, and means for holding said cap in position on said spring.

In testimony whereof, I have subscribed my name.

DAVID W. JONES

Copies of this patent may be obtained for five cents each, by addressing the "Commissioner of Patents, Washington, D. C."